(12) United States Patent
Houmard Le Gurun

(10) Patent No.: US 11,492,078 B2
(45) Date of Patent: Nov. 8, 2022

(54) SEMI-SUBMERSIBLE FLOATER, PARTICULARLY FOR A FLOATING WIND TURBINE

(71) Applicant: NAVAL ENERGIES, Paris (FR)

(72) Inventor: Anne Houmard Le Gurun, Groix (FR)

(73) Assignee: NAVAL ENERGIES, Paris (FR)

( * ) Notice: Subject to any disclaimer, the term of this patent is extended or adjusted under 35 U.S.C. 154(b) by 0 days.

(21) Appl. No.: 16/981,415

(22) PCT Filed: Mar. 14, 2019

(86) PCT No.: PCT/EP2019/056461
§ 371 (c)(1),
(2) Date: Sep. 16, 2020

(87) PCT Pub. No.: WO2019/179881
PCT Pub. Date: Sep. 26, 2019

(65) Prior Publication Data
US 2021/0009236 A1    Jan. 14, 2021

(30) Foreign Application Priority Data

Mar. 21, 2018 (FR) .................... 18 52409

(51) Int. Cl.
*B63B 1/10* (2006.01)
*B63B 35/44* (2006.01)
*F03D 13/25* (2016.01)

(52) U.S. Cl.
CPC .............. *B63B 1/107* (2013.01); *B63B 35/44* (2013.01); *F03D 13/25* (2016.05);
(Continued)

(58) Field of Classification Search
CPC ... B63B 1/107; B63B 35/44; B63B 2035/446; F03D 13/25; F05B 2240/93; F05B 2240/95
See application file for complete search history.

(56) References Cited

U.S. PATENT DOCUMENTS 10,202,170 B2 * 2/2019 Dagher ................. B63B 5/18
2005/0160958 A1   7/2005 Kryska et al.

FOREIGN PATENT DOCUMENTS

JP    2016-531804 A    10/2016
WO    2004/050466      6/2004
(Continued)

OTHER PUBLICATIONS

International Search Report for PCT/EP2019/056461 dated Apr. 9, 2019, 6 pages, with English Translation.
(Continued)

*Primary Examiner* — Tulsidas C Patel
*Assistant Examiner* — Joseph Ortega
(74) *Attorney, Agent, or Firm* — Nixon & Vanderhye

(57) ABSTRACT

Disclosed is a semi-submersible floater defining an operating state and a non-operating state, and including at least two outer columns, a central column for receiving a payload, and, for each outer column, a branch in the form of pontoon connecting the outer column to the central column and defining a branch axis oriented from the central column towards the outer column. Each branch is formed from a first portion and a second portion which extend successively along the corresponding branch axis, each one over at least 10% of the total extent of the branch, along the branch axis. In the operating state of the floater, the second portion of each branch is at least partially filled with a ballast material, and the first portion does not contain any ballast material.

18 Claims, 2 Drawing Sheets

(52) U.S. Cl.
CPC ..... *B63B 2035/446* (2013.01); *F05B 2240/93* (2013.01); *F05B 2240/95* (2013.01)

(56) References Cited

FOREIGN PATENT DOCUMENTS

| WO | 2014/031009 A1 | 2/2014 |
| WO | 2015/048147 | 4/2015 |
| WO | 2016/172149 | 10/2016 |
| WO | 2017/220878 | 12/2017 |

OTHER PUBLICATIONS

Written Opinion of the ISA for PCT/EP2019/056461 dated Apr. 9, 2019, 6 pages.
French Search Report for French Application No. 18 52409, dated Oct. 4, 2018, 2 pages.
Office Action issued in Japanese Patent Application No. 2020-550744 dated Aug. 15, 2022.

\* cited by examiner

SEMI-SUBMERSIBLE FLOATER, PARTICULARLY FOR A FLOATING WIND TURBINE

CROSS-REFERENCE TO RELATED APPLICATIONS

This application is the U.S. national phase of International Application No. PCT/EP2019/056461 filed Mar. 14, 2019 which designated the U.S. and claims priority to French Application No. 18 52409 filed Mar. 21, 2018, the entire contents of each of which are hereby incorporated by reference.

BACKGROUND OF THE INVENTION

Field of the Invention

The present invention relates to a semi-submersible floater, particularly for a floating wind turbine.

The present invention also relates to a method for installing such a semi-submersible floater.

Description of Related Art

In a manner known in itself, a semi-submersible floater generally comprises a central column and at least two outer columns each connected to the central column by a pontoon-shaped branch.

For example, the floater is configured to float on a surface of the sea.

The floater in particular defines an operating state in which it is located on its operating site at sea and anchored to the seabed. In this state of the floater, the floating wind turbine is able to generate electricity. Furthermore, in this state, the semi-submersible floater has a predefined draught.

Thus, in the operating state of the semi-submersible floater, the central column imparts buoyancy to the floater. The central column in particular has a significant submerged volume, but which does not offset the weight of the mast, the turbine and the nacelle that the central column receives. As a result, the central column is subjected to a downward force, that is to say, toward the seabed.

The outer columns also impart buoyancy to the semi-submersible floater and have a significant submerged volume.

In particular, their buoyancy exceeds their weight. Each outer column is therefore subject to a resultant force oriented upward, that is to say, in a direction opposite the seabed. This results in tensile stresses in the bottom slab of the central column and in that of the corresponding pontoon-shaped branch.

The pontoon-shaped branches also have a significant buoyancy. This causes significant shear stresses at the junction of each pontoon-shaped branch with the central column.

Furthermore, during operation, the turbine causes thrust on the semi-submersible floater. This thrust is in particular a function of the power of the floating wind turbine and must be at least partially counterbalanced in order to stabilize the floater.

The forces applied on the floater are also caused by the mechanical stresses induced by the environmental conditions such as wind, swell, current, irrespective of whether the turbine is operating. This results in a dynamic amplification of these mechanical stresses when the floating wind turbine is set in motion under the effect of the environmental conditions.

It is therefore desirable to balance the forces applied on the semi-submersible floater when the latter is in the operating state.

BRIEF SUMMARY OF THE INVENTION

The invention aims to propose a semi-submersible floater having a particularly increased stability when it is in the operating state.

To that end, the present invention relates to a semi-submersible floater, in particular for a floating wind turbine, defining an operating state and a non-operating state, and comprising:
  at least two outer columns,
  a central column for receiving a payload, and
  for each outer column, a pontoon-shaped branch connecting said outer column to the central column and defining a branch axis oriented from the central column towards said outer column,
  each pontoon-shaped branch is formed by a first portion and a second portion that extend successively along the corresponding branch axis, each one over at least 10% of the total extent of said pontoon-shaped branch, along this branch axis,
  wherein in the operating state of the semi-submersible floater, the second portion of each branch is at least partially filled with a ballast material, and in that the first portion does not contain any ballast material.

In other words, in the operating state of the floater, the second portion of each branch comprises the ballast material while the first portion does not comprise such a material.

According to specific embodiments, the semi-submersible floater comprises one or more of the following features, considered alone or according to any technically possible combinations:
  each outer column comprises a ballast able to be filled with a ballast material, arranged in the extension of the pontoon-shaped branch connecting the central column to this outer column along the corresponding branch axis, and in the operating state of the semi-submersible floater, the volume of the ballast material of the ballast of each outer column is between 40% and 60% of the total volume of this ballast;
  the volume of the ballast material of the second portion of each pontoon-shaped branch is between 80% and 100% of the total volume of this portion;
  each second portion comprises a first compartment and a second compartment successively extending along the branch axis (A) and in the operating state of the semi-submersible floater, the volume of the ballast material of each first compartment is between 40% and 60% of the total volume of this compartment and the volume of the ballast material of each second compartment is between 80% and 100% of the total volume of this compartment;
  the ratio of the extent of the second compartment of the second portion of each pontoon-shaped branch along the corresponding branch axis to the extent of the first compartment of the second portion of this same branch along the corresponding branch axis, is between 2 and 4;
  each second portion comprises at least one inner partition arranged in the second compartment of this portion, the inner partition dividing this compartment into at least two compartment parts;

the second portion of each pontoon-shaped branch extends over 30% to 80% of the total extent of this branch, along the corresponding branch axis;

the first portion of each pontoon-shaped branch is tightly isolated from the second portion of this branch and wherein the central column does not contain any ballast;

the central column does not contain any ballast; and the ballast material comprises at least one of the materials from the following list: seawater, mud, sand, gravel.

The invention also relates to an installation method for a semi-submersible floater, in particular for a floating wind turbine, the semi-submersible floater defining an operating state and a non-operating state, and comprising:

at least two outer columns, a central column for receiving a payload, and for each outer column, an pontoon-shaped branch connecting this outer column to the central column and defining a branch axis oriented from the central column towards this outer column, each pontoon-shaped branch is formed by a first portion and a second portion that extend successively along the corresponding branch axis, each one over at least 10% of the total extent of said pontoon-shaped branch, along this branch axis, wherein the method comprises the following steps for placing the semi-submersible floater in the operating state:

filling the second portion of each pontoon-shaped branch at least partially with a ballast material, and leaving the first portion of each pontoon-shaped branch empty of ballast material.

BRIEF DESCRIPTION OF THE SEVERAL VIEWS OF THE DRAWINGS

Other features and advantages of the invention will appear upon reading the following description of embodiments of the invention, solely as an example in reference to the drawings, which are.

DETAILED DESCRIPTION OF THE INVENTION

In the present disclosure, a quantity is substantially equal to a value V when the quantity is equal to within plus or minus 10% of the value V.

Figure 1:
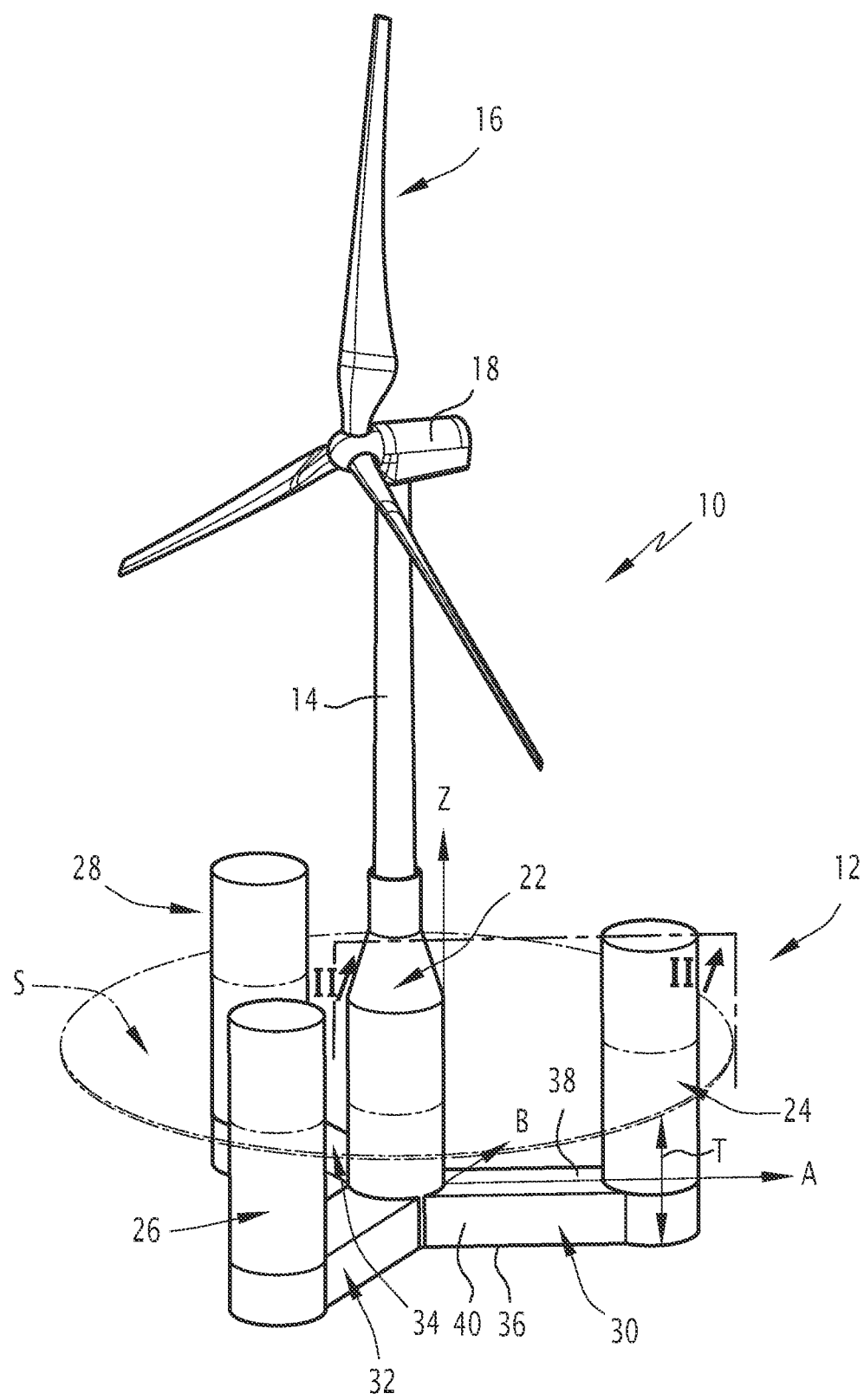
FIG. 1, a schematic perspective view of an exemplary floating wind turbine comprising a semi-submersible floater according to the invention, and FIG. 2, a schematic sectional view of the semi-submersible floater of FIG. 1 along the sectional plane II-II indicated in FIG. 1.

A floating wind turbine 10 is shown in FIG. 1.

In reference to this figure, the floating wind turbine 10 comprises a semi-submersible floater 12, at least one mast 14, a turbine 16 and a nacelle 18 supporting at least part of the turbine 16.

In the remainder of the present disclosure, the semi-submersible floater 12 is called "floater 12."

The floater 12 is configured to float on a surface S of a body of water 20, such as the surface of the sea.

The floater 12 has an operating state and a non-operating state.

In the operating state of the floater 12, as previously mentioned, the floater 12 is located on its operating site at sea and is for example anchored to the seabed by an anchoring device (not shown in the figures). Furthermore, in the operating state of the floater 12, the floating wind turbine 10 is able to generate electricity. It is in particular understood that in the operating state of the floater 12, the turbine 16 is or is not running. Furthermore, in the operating state of the floater 12, the floater 12 has a predefined draught T.

The floater 12 illustrated in FIG. 1 is in the operating state.

In the non-operating state of the floater 12, the floating wind turbine 10 is not able to generate electricity. In this state, the floater 12 also has a predefined draught that is less than the predefined draught T of the floater 12 in the operating state. For example, a non-operating state of the floater 12 corresponds to a towing phase of the floater 12 from a port to its operating site.

The floater 12 comprises a central column 22 and at least two outer columns. Furthermore, for each outer column, the floater 12 comprises a pontoon-shaped branch connecting this outer column to the central column 22.

In the exemplary embodiment of FIG. 1, the floater 12 comprises three outer columns 24, 26, 28 and therefore three pontoon-shaped branches 30, 32, 34.

The outer columns 24, 26, 28 are arranged in a star around the central column 22, and for example evenly angularly distributed around the central column 22. Thus, in this case, the angle between each pair of pontoon-shaped branches 30, 32, 34 is substantially equal to 120 degrees.

According to another embodiment, the floater 12 comprises two outer columns. In this case, the central column forms the apex of an isosceles triangle and the other two apices are respectively formed by an outer column. Furthermore, for each outer column, a pontoon-shaped branch connects the central column to this outer column.

According to another embodiment, the floater 12 comprises four outer columns evenly angularly distributed around the central column. Thus, the angle between two successive pontoon-shaped branches is substantially equal to 90 degrees. Furthermore, similarly, for each outer column, a pontoon-shaped branch connects the central column to this outer column.

Each pontoon-shaped branch 30, 32, 34 defines a branch axis A, oriented from the central column 22 toward the corresponding outer column 24, 26, 28. As shown in FIG. 1, a branch axis A is shown for the pontoon-shaped branch 30.

The central column 22 defines a vertical axis Z, perpendicular to the branch axis A.

Furthermore, each pontoon-shaped branch 30, 32, 34 defines a transverse axis B perpendicular to the corresponding branch axis A.

As shown in FIG. 1, the central column 22 receives a payload. In the illustrated case of a floating wind turbine, the payload in particular comprises the mast 14, the nacelle 18 and the turbine 16.

The central column 22 for example assumes the form of a cylinder having a circular section and vertical axis Z. For example, the diameter D1 of the central column 22 is equal to 10 meters (m).

The central column 22 comprises a base 22A and a head 22B.

The base 22A is arranged in the extension of each pontoon-shaped branch 30, 32, 34 along the corresponding branch axis A. For example, the base 22A is at least partially made from concrete.

The head 22B of the central column 22 is fixed on the base 22A. The head 22B and the base 22A are coaxial with vertical axis Z. The head 22B of the central column 22 is for example made from steel.

For example, the central column 22 has a height H1 in the vertical direction Z between 30 m and 40 m.

Figure 2:
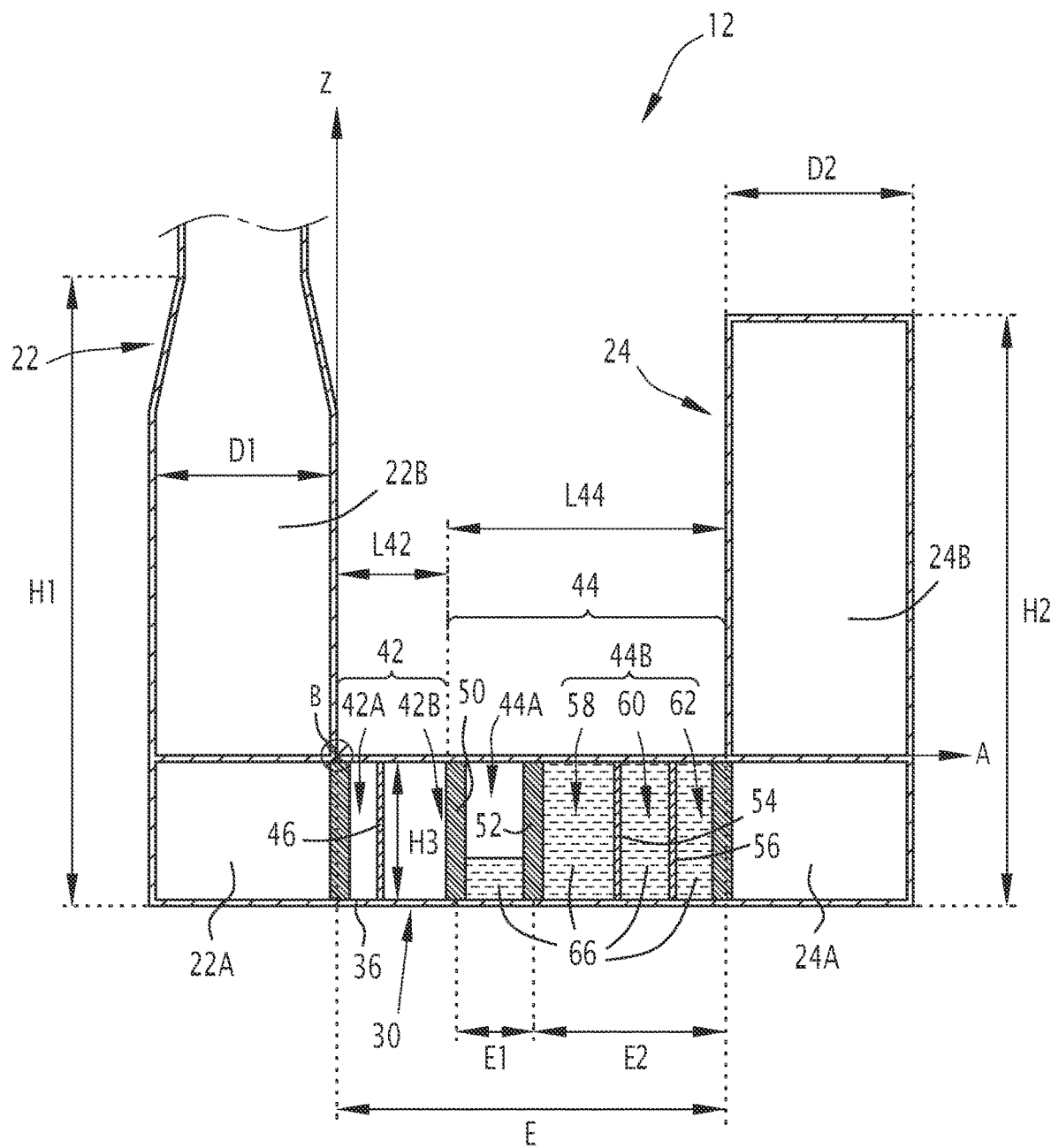

The remainder of the description of the floater 12 is done in reference to FIG. 2.

Furthermore, hereinafter, the floater 12 is described in relation to the central column 22, one of the outer columns 24 among the three outer columns 24, 26, 28 and the pontoon-shaped branch 30 connecting the central column 22 to this outer column 24.

Thus, each other outer column 26, 28 is similar to the outer column 24 described hereinafter. Furthermore, each other pontoon-shaped branch 32, 34 is also similar to the pontoon-shaped branch 30 described hereinafter.

Like the central column 22, the outer column 24 assumes the form of a cylinder having a circular section and vertical axis Z. As an illustration, the diameter D2 of the outer column 24 is between 9 m and 9.5 m.

The outer column 24 also comprises a base 24A and a head 24B.

The base 24A is arranged in the extension of the pontoon-shaped branch 30 along the branch axis A. For example, the base 24A is at least partially made from concrete.

The head 24B is fixed on the corresponding base 24A. The head 24B and the base 24A are coaxial with vertical axis Z.

The outer column 24 has a height H2 along the vertical axis Z for example between 30 m and 40 m.

The pontoon-shaped branch 30 for example has a parallelepipedic shape, delimited by four slabs forming the faces of the parallelepiped. Thus, this branch 30 comprises a bottom slab 36, a top slab 38 and two side slabs 40 connecting the bottom slab 36 and the top slab 38. Only the side slab 40 is visible in FIG. 1.

The pontoon-shaped branch 30 is formed by a first portion 42 and a second portion 44 extending successively along the branch axis A. FIG. 2 identifies the length of the first portion 42 by "L42" and identifies the length of the second portion 44 by "L44".

The pontoon-shaped branch 30 defines a total extent E of this branch 30. The total extent E corresponds to the length of a straight line connecting the two ends of this branch 30 along the branch axis A.

As an illustration, this total extent E is between 20 m and 30 m.

The height H3 of the pontoon-shaped branch 30 along the vertical axis Z is for example between 8 m and 9 m.

The width L of the pontoon-shaped branch 30 along the transverse axis B is for example substantially equal to the diameter D2 of the outer column 24.

The first portion 42 extends over at least 10% of the total extent E of the pontoon-shaped branch 30.

Preferably, the first portion 42 extends over at least 20% of the total extent E of the pontoon-shaped branch and advantageously over at least 35% of the total extent E of the pontoon-shaped branch.

More specifically, the first portion 42 extends over 20% to 70%, preferably over 35% to 45%, and advantageously over substantially 40% of the total extent E of the pontoon-shaped branch 30.

Furthermore, the first portion 42 is tightly isolated from the central column 22 and more specifically from the base 22A of the central column 22 as well as the second portion 44, for example, by a tight wall 50.

The second portion 44 also extends over at least 10% of the total extent E of the pontoon-shaped branch 30.

More specifically, the second portion 44 extends over 30% to 80%, preferably over 55% to 65%, and advantageously over substantially 60% of the total extent E of the pontoon-shaped branch 30.

The second portion 44 comprises a first compartment 44A and a second compartment 44B extending successively along the branch axis A.

The first compartment 44A has an extent E1 and the second compartment 44B has an extent E2. The extent E1 of the first compartment 44A corresponds to the length of a straight line connecting the two ends of the first compartment 44A along the branch axis A. Likewise, the extent E2 of the second compartment 44B corresponds to the length of a straight line connecting the two ends of the second compartment 44B along the branch axis A.

The ratio of the extent E2 of the second compartment 44B to the extent E1 of the first compartment 44A is for example between 2 and 4. More specifically, the ratio is between 2 and 3. For example, the ratio is equal to 2.5.

The first compartment 44A is tightly isolated from the second compartment 44B, for example by a tight wall 52. Furthermore, the second compartment 44B is tightly isolated from the outer column 24, and more specifically from the base 24A of the outer column 24.

The second compartment 44B defines a total volume corresponding to the volume of the free inner space of the branch 30 delimited by the slabs 36, 38, 40, the tight wall 52 arranged between the first and the second portion 42, 44 and a wall insulating the second compartment 44B from the outer column 24.

Thus, the second portion 44B forms a ballast for receiving a ballast material 66.

For example, the ballast material 66 is seawater.

In a variant, the ballast material 66 comprises sand, gravel and/or mud.

According to one advantageous aspect of the invention, the first portion 42 comprises an inner partition dividing the first portion 42 into two first portion 42 parts 42A, 42B.

Furthermore, the second portion 44 for example comprises two inner partitions 54, 56 dividing the second compartment 44B into three compartment parts 58, 60, 62. In this case, the total volume of the second compartment 44B corresponds to the sum of the volumes of the free inner spaces of the three second compartment 42B parts 58, 60, 62.

According to another advantageous aspect of the invention, the base 24A of the outer column 24 defines a ballast for receiving ballast material 66.

In this case, the ballast formed by the base 24A of the outer column 24 for example replaces the first compartment 44A of the second portion 44 of the pontoon-shaped branch 30. In other words, the second portion 44 no longer comprises a first compartment 44A. The ballast formed by the base 24A of the outer column 24 has a total volume for example equal to the free inner space of this base 24A.

A method for installing a floater 12 of a floating wind turbine in the operating state is described in the remainder of the present disclosure.

The installation method is also described in relation to the central column 22, one of the outer columns 24 among the three outer columns 24, 26, 28 and the pontoon-shaped branch 30 connecting the central column 22 to this outer column 24.

Thus, the steps of the method described in relation with the pontoon-shaped branch 30 apply in the same way for each other each other pontoon-shaped branch 32, 34 of the floater 12.

The installation method begins once the floater 12 is located on its operating site.

Initially, the first and second portions 42, 44 do not contain any ballast material 66.

The method comprises a filling step during which the second portion 44 of the pontoon-shaped branch 30 is at least partly filled with ballast material 66.

More specifically, during this filling step, 40% to 60% of the total volume of the first compartment 44A of the second portion 44 is filled with the ballast material 66. Furthermore, during this same step, 80% to 100% of the total volume of the second compartment 44B is filled with the ballast material 66.

The method further comprises a step during which the first portion 42 of the pontoon-shaped branch 30 is left empty of ballast material.

In this example, the central column 22 and the outer column 24 are also left empty of ballast material 66.

According to another exemplary embodiment of the method, when the base 24A of the outer column 24 forms a ballast and the second portion 44 does not have the first compartment 44A, during the filling step, 80% to 100% of the total volume of the second compartment 44B of the second portion 44 is filled with the ballast material 66 and 40% to 60% of the total volume of the ballast of the outer column 24 is filled with the ballast material 66.

Filling at least part of the second portion 44 with ballast material 66 and leaving the first portion 42 free of any ballast material 66 makes it possible to obtain a floater 12 in the operating state having an increased stability.

Filling the second portion 44 in particular makes it possible to adjust the hydrostatic stiffness to which the floater 12 is subjected, so as to withstand the thrust of the turbine 16 of the floating wind turbine 10.

Furthermore, when the second portion 44 is filled with ballast material, the forces within the floater 12 connected to the structure of the floater 12 itself are balanced, in particular by adjusting the draught.

More specifically, filling the second portion 44 makes it possible to balance the shear and flexural stresses at the junction between the pontoon-shaped branch 30 and the central column 22 because the weight of the second portion 44 becomes greater than the hydrostatic thrust to which it is subjected. In particular, filling the total volume of the second compartment 44B by 80% to 100% with the ballast material 66 makes it possible to increase the weight of the portion of the pontoon-shaped branch 30 as close as possible to the outer column 24 in order to compensate for the significant buoyancy of the outer column 24.

Furthermore, filling the second portion 44 also has the advantage of balancing the tensile stresses to which the bottom slab 36 of the pontoon-shaped branch 30 and that of the central column 22 are subjected.

Furthermore, the second portion 44 of the pontoon-shaped branch 30 is the portion of this branch that is most subject to variations in hydrostatic and hydrodynamic pressure when the wind turbine 10 tilts. Thus, filling the second portion 44 of the pontoon-shaped branch 30 makes it possible to decrease the pressure difference between the inside and the outside of this branch. This then reduces the "membrane" effect of the slabs 36, 38, 40 making up the branch 30.

In the exemplary embodiment in which the first compartment 44A is filled with ballast material, due to the filling of this first compartment 44A, the evolution of the shear stresses is more gradual along the pontoon-shaped branch 30 along the corresponding branch axis A.

Furthermore, when the first compartment 44A is filled with the ballast material 66, this compartment 44A has a buoyancy and a weight that offset one another.

In the exemplary embodiment in which the base 24A of the outer column 24 forms a ballast, an increased stability of the floater 12 is obtained by at least partially filling this ballast.

Lastly, the tight walls 50, 52 and the inner partitions 46, 54, 56 increase the resistance of the branch 30 to the pressure from the sea water to which it is subjected. Additionally, the inner walls 54, 56 of the second compartment 44B make it possible to eliminate the free surface effects when the ballast material 66 is at least partially liquid.

The invention claimed is:

1. A semi-submersible floater for a floating wind turbine, defining an operating state and a non-operating state, and comprising:
    at least two outer columns,
    a central column for receiving a payload, and
    for each outer column, a pontoon-shaped branch connecting this outer column to the central column and defining a branch axis oriented from the central column towards this outer column,
    each pontoon-shaped branch is formed by a first portion and a second portion positioned in this order along the corresponding branch axis with the first portion being closer to the central column and the second portion being further from the central column,
    wherein the first portion has a length along this branch axis equal to or greater than 10% of a total length of said pontoon-shaped branch along this branch axis,
    wherein the second portion has a length along this branch axis equal to or greater than 10% of the total length of said pontoon-shaped branch along this branch axis,
    wherein each outer column comprises a ballast able to be filled with a ballast material, arranged in the extension of the pontoon-shaped branch connecting the central column to this outer column along the corresponding branch axis,
    wherein in the operating state of the semi-submersible floater, the second portion of each branch is at least partially filled with a ballast material, and wherein the first portion of each branch does not contain any ballast material, and
    wherein in the operating state of the semi-submersible floater, the volume of said ballast material of the ballast of each outer column is between 40% and 60% of the total volume of this ballast.

2. The semi-submersible floater according to claim 1, wherein the volume of the ballast material of the second portion of each pontoon-shaped branch is between 80% and 100% of the total volume of this portion.

3. The semi-submersible floater according to claim 2, wherein the length of the second portion of each pontoon-shaped branch is equal to or greater than 30% of the total length of this branch and equal to or less than 80% of the total length of this branch.

4. The semi-submersible floater according to claim 2, wherein the first portion of each pontoon-shaped branch is tightly isolated from the second portion of this branch.

5. The semi-submersible floater according to claim 1, wherein each second portion comprises a first compartment and a second compartment, the first compartment and the second compartment being positioned in this order along the branch axis, and
    wherein in the operating state of the semi-submersible floater, the volume of the ballast material of each first compartment is between 40% and 60% of the total volume of this compartment and the volume of the ballast material of each second compartment is between 80% and 100% of the total volume of this compartment.

6. The semi-submersible floater according to claim 5, wherein the ratio of a length of the second compartment of the second portion of each pontoon-shaped branch along the corresponding branch axis to a length of the first compartment of the second portion of this same branch along the corresponding branch axis, is between 2 and 4.

7. The semi-submersible floater according to claim 6, wherein each second portion comprises at least one inner partition arranged in the second compartment of this portion, the inner partition dividing this compartment into at least two compartment parts.

8. The semi-submersible floater according to claim 6, wherein the length of the second portion of each pontoon-shaped branch is equal to or greater than 30% of the total length of this branch and equal to or less than 80% of the total length of this branch.

9. The semi-submersible floater according to claim 5, wherein each second portion comprises at least one inner partition arranged in the second compartment of this portion, the inner partition dividing this compartment into at least two compartment parts.

10. The semi-submersible floater according to claim 9, wherein the length of the second portion of each pontoon-shaped branch is equal to or greater than 30% of the total length of this branch and equal to or less than 80% of the total length of this branch.

11. The semi-submersible floater according to claim 5, wherein the length of the second portion of each pontoon-shaped branch is equal to or greater than 30% of the total length of this branch and equal to or less than 80% of the total length of this branch.

12. The semi-submersible floater according to claim 1, wherein the length of the second portion of each pontoon-shaped branch is equal to or greater than 30% of the total length of this branch and equal to or less than 80% of the total length of this branch.

13. The semi-submersible floater according to claim 1, wherein the first portion of each pontoon-shaped branch is tightly isolated from the second portion of this branch.

14. The semi-submersible floater according to claim 1, wherein the central column does not contain any ballast material.

15. The semi-submersible floater according to claim 1, wherein the ballast material comprises at least one of the materials from the following list:
seawater,
mud,
sand,
gravel.

16. The semi-submersible floater according to claim 1, wherein the length of the second portion of each pontoon-shaped branch is equal to or greater than 30% of the total length of this branch and equal to or less than 80% of the total length of this branch.

17. The semi-submersible floater according to claim 1, wherein the first portion of each pontoon-shaped branch is tightly isolated from the second portion of this branch.

18. A method for installing a semi-submersible floater for a floating wind turbine, the semi-submersible floater defining an operating state and a non-operating state, and comprising:
at least two outer columns,
a central column for receiving a payload, and
for each outer column, a pontoon-shaped branch connecting this outer column to the central column and defining a branch axis oriented from the central column towards this outer column,
each pontoon-shaped branch is formed by a first portion and a second portion positioned in this order along the corresponding branch axis with the first portion being closer to the central column and the second portion being further from the central column,
wherein the first portion has a length along this branch axis equal to or greater than 10% of a total length of said pontoon-shaped branch along this branch axis,
wherein the second portion has a length along this branch axis equal to or greater than 10% of the total length of said pontoon-shaped branch along this branch axis,
wherein each outer column comprises a ballast able to be filled with a ballast material, arranged in the extension of the pontoon-shaped branch connecting the central column to this outer column along the corresponding branch axis, and
wherein the method comprises the following steps for placing the semi-submersible floater in the operating state:
filling the second portion of each pontoon-shaped branch at least partially with a ballast material, and
leaving the first portion of each pontoon-shaped branch empty of ballast material, and
filling the ballast of each outer column with said ballast material, the volume of the ballast material of the ballast of each outer column being between 40% and 60% of the total volume of this ballast.

* * * * *